US011132342B2

(12) United States Patent
Qingsong et al.

(10) Patent No.: US 11,132,342 B2
(45) Date of Patent: Sep. 28, 2021

(54) PERIODICITY DETECTION AND PERIOD LENGTH ESTIMATION IN TIME SERIES

(71) Applicant: Alibaba Group Holding Limited, Grand Cayman (KY)

(72) Inventors: Wen Qingsong, Issaquah, WA (US); Kai He, Bellevue, WA (US); Jingkun Gao, Bellevue, WA (US); Liang Sun, Bellevue, WA (US); Jian Tan, Sunnyvale, CA (US); Tao Yao, Bellevue, WA (US)

(73) Assignee: Alibaba Group Holding Limited, George Town (KY)

( * ) Notice: Subject to any disclaimer, the term of this patent is extended or adjusted under 35 U.S.C. 154(b) by 111 days.

(21) Appl. No.: 16/700,981

(22) Filed: Dec. 2, 2019

(65) Prior Publication Data

US 2021/0165770 A1   Jun. 3, 2021

(51) Int. Cl.
*G06F 16/00*   (2019.01)
*G06F 16/21*   (2019.01)
*G06F 16/25*   (2019.01)
*G06F 16/215*  (2019.01)
*G06F 16/2458* (2019.01)

(52) U.S. Cl.
CPC .......... *G06F 16/212* (2019.01); *G06F 16/215* (2019.01); *G06F 16/2474* (2019.01); *G06F 16/258* (2019.01)

(58) Field of Classification Search
None
See application file for complete search history.

(56) References Cited

U.S. PATENT DOCUMENTS

| 2010/0205039 | A1* | 8/2010  | Basak    | G06Q 10/04    |
|              |     |         |          | 705/7.31      |
| 2016/0342910 | A1* | 11/2016 | Chu      | G06T 11/206   |
| 2017/0249649 | A1* | 8/2017  | Garvey   | G06Q 10/0631  |
| 2021/0073097 | A1* | 3/2021  | Upadhyay | G06F 11/0757  |
| 2021/0073190 | A1* | 3/2021  | Bedadala | G06F 16/2365  |

* cited by examiner

*Primary Examiner* — Bai D Vu
(74) *Attorney, Agent, or Firm* — Lee & Hayes, P.C.

(57) ABSTRACT

Input time series data of a particular time length may be received, and pre-processed to obtain processed time series data. The processed time series data may then be decomposed into a plurality of pieces of time series data of the particular time length at different levels, and a detection of whether a piece of time series data at a particular level includes a periodic component candidate in a frequency domain may be performed. In response to detecting that the piece of time series data at the particular level includes the periodic component candidate in the frequency domain, a validation may be performed to determine whether the periodic component candidate in the piece of time series data at the particular level is a true periodic component of the input time series data in a time domain.

20 Claims, 4 Drawing Sheets

PERIODICITY DETECTION AND PERIOD LENGTH ESTIMATION IN TIME SERIES

BACKGROUND

Periodicity detection is an important task in time series analysis, and plays a crucial role in a number of time series tasks, which may include, but are not limited to, classification, forecasting, anomaly detection, clustering, and compression, etc. Due to the complexity of time series, however, accurate and robust periodicity detection is difficult, if not impossible. The difficulties of accurate and robust periodicity detection stem from the non-stationary nature of a time series, dynamic and complicated periodic patterns (including interlaced patterns) in the time series, noises and outliers, and the lack of knowledge of the number of the periodic patterns in the time series, etc.

For example, the number of users accessing a gaming website or a shopping website may exhibit a number of periodic patterns, which may include a weekly periodic pattern (e.g., an abrupt increase in the number of users during each weekend), a monthly periodic pattern (e.g., an abrupt increase or decrease in the number of users in certain days of each month), an annually periodic pattern (e.g., an abrupt increase in the number of users during particular holidays annually), etc. Since respective time periods and natures of these periodic patterns may or may not be known in advance, this may further complicate the periodicity detection, and thus lead to the development of sophisticated periodicity detection methods that could be computationally intensive and fail to adapt to various conditions. These existing periodicity detection methods have poor performance and produce false positives when the number of underlying periodic patterns is unknown and/or more than one.

SUMMARY

This summary introduces simplified concepts of a periodicity detection system, which will be further described below in the Detailed Description. This summary is not intended to identify essential features of the claimed subject matter, nor is it intended for use in limiting the scope of the claimed subject matter.

This disclosure describes example implementations of a periodicity detection system. In implementations, input time series data of a particular time length may be received, and pre-processed to obtain processed time series data. In implementations, the pre-processing may include at least removing a trend in the input time series data. The processed time series data may then be decomposed into a plurality of pieces of time series data of the particular time length at different levels, and a detection of whether a piece of time series data at a particular level includes a periodic component candidate in a frequency domain may be performed. In response to detecting that the piece of time series data at the particular level includes the periodic component candidate in the frequency domain, a validation may be performed to determine whether the periodic component candidate in the piece of time series data at the particular level is a true periodic component of the input time series data in the time domain.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
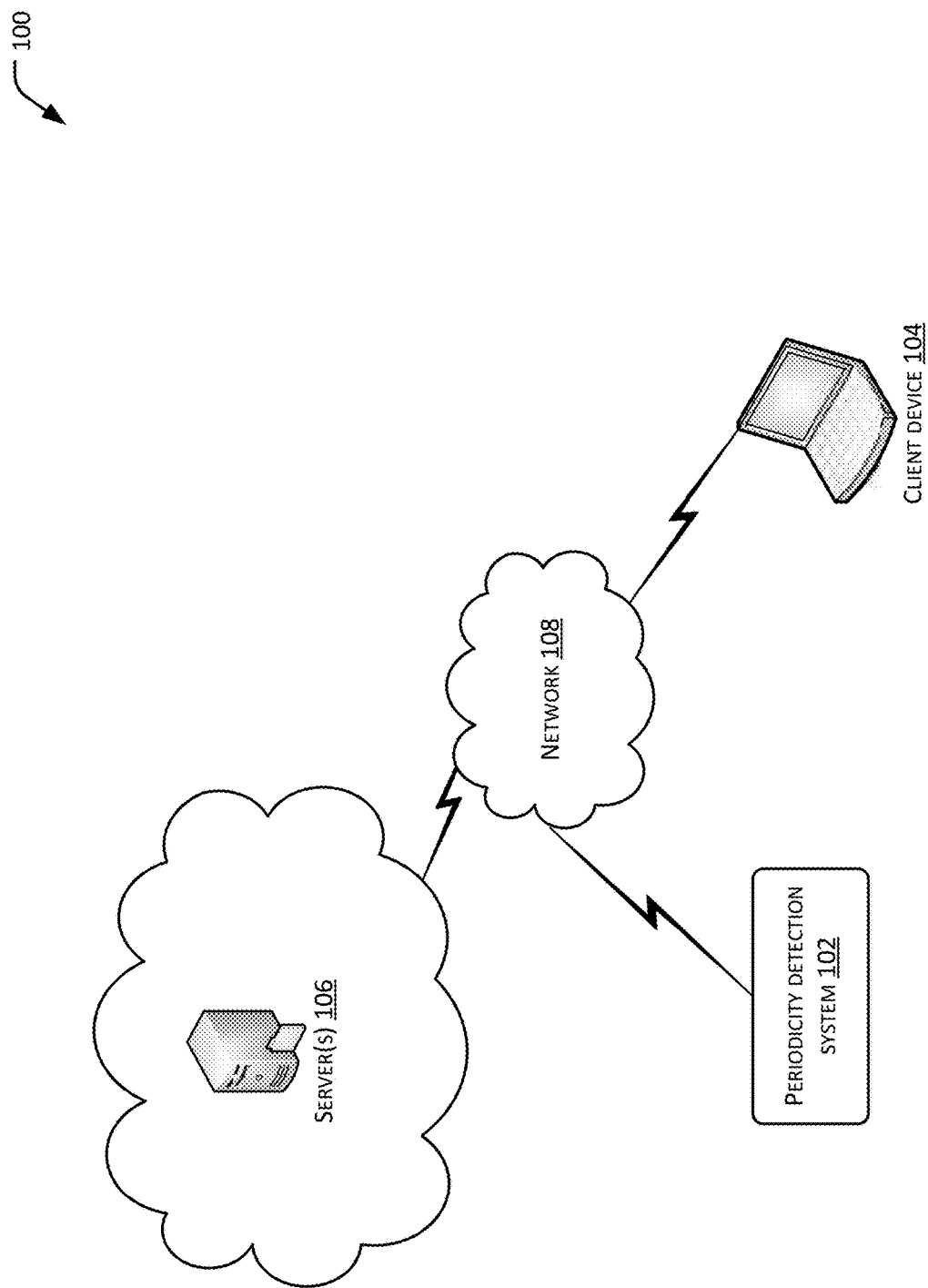
FIG. 1 illustrates an example environment in which an example periodicity detection system may be used.

As noted above, periodicity detection is an important task in a time series analysis. However, due to the nature of time series, periodicity detection faces a number of technical hurdles, which lead to the development of a number of sophisticated periodicity detection algorithms. These existing periodicity detection algorithms, however, are either computationally intensive, or are inflexible to adapt to various conditions. For example, the existing periodicity detection methods have poor performance and produce false positives, when the number of underlying periodic patterns is unknown and/or more than one.

This disclosure describes an example periodicity detection system. The periodicity detection system may receive a time series having an unknown number of periodic patterns with unknown time periods. The periodicity detection system may detect and estimate the number and the time periods of the periodic patterns through a combination of detections and estimations in both time and frequency domains.

In implementations, the periodicity detection system may receive input time series data of a particular time length. The periodicity detection system may process the input time series data to obtain processed time series data. In implementations, the periodicity detection system may process the input time series data by applying a trend extraction filter on the input time series data to extract a trend component from the input series data. Examples of the trend extraction filter may include, but are not limited to, a Hodrick-Prescott (H-P) filter. Additionally, the periodicity detection system may further process the input time series data by performing normalization on the input time series data and/or removing outliers from the input time series data.

After processing the input time series data, the periodicity detection system may further decompose the processed time series data into a plurality of pieces of time series data of the particular time length at different levels according to a particular decomposition method. In implementations, the particular decomposition method may include a transformation method that transforms the processed time series data from a time domain (or a first domain) into a time-frequency domain (or a second domain), i.e., decomposing the processed time series data into a plurality of pieces of time series data (or called a plurality of time series components) in the time-frequency domain. In implementations, the particular decomposition method may include, but is not limited to, a maximal overlap discrete wavelet transform, a wavelet transform, a Gabor transform, etc. In implementations, transformed components of the time series in the time-frequency domain may be represented differently, depending on the type of the particular decomposition method (or the transformation method) that is used.

In implementations, the periodicity detection system may determine or detect whether a potential periodic component or a periodic component candidate exists in the frequency domain. By way of example and not limitation, after decomposing the processed time series data into a plurality of pieces of time series data of the particular time length at different levels, the periodicity detection system may detect whether a piece of time series data at a particular level in the frequency domain (or a particular time series component in the frequency domain) includes a periodic component candidate.

In implementations, the periodicity detection system may detect whether a piece of time series data at a particular level in a frequency domain includes a periodic component candidate by obtaining a periodogram for the piece of time series data at the particular level and determining whether the periodogram satisfies a predetermined hypothesis test. If the periodogram passes the predetermined hypothesis test, the periodicity detection system may determine that the piece of time series data at the particular level includes a periodic component candidate. In implementations, the periodicity detection system may obtain one or more pieces of time series data at one or more particular levels that are detected or determined to include periodic component candidates.

In implementations, in response to detecting or determining that one or more pieces of time series data at one or more particular levels include periodic component candidates in the frequency domain, the periodicity detection system may validate whether the one or more periodic component candidates in the one or more pieces of time series data at the one or more particular levels are true periodic components of the input time series data. In implementations, the periodicity detection system may validate whether the one or more periodic component candidates in the one or more pieces of time series data at the one or more particular levels are true periodic components of the input time series data in the time domain.

By way of example and not limitation, the periodicity detection system may perform and obtain an autocorrelation of a piece of time series data at a particular level that includes a periodic component candidate in the time domain, and calculate a median distance of a plurality of peaks having respective heights greater than a predetermined threshold in the autocorrelation. The periodicity detection system may then validate whether the periodic component is the true periodic component candidate based on whether the median distance is located within a predetermined range associated with the particular level of the piece of time series data. For example, the periodicity detection system may validate that the periodic component is the true periodic component candidate with a period length as the median distance of the plurality of peaks in the response to determining that the median distance is located within the predetermined range associated with the particular level of the piece of time series data.

In implementations, functions described herein to be performed by the periodicity detection system may be performed by multiple separate units or services. For example, a receiving service may receive input time series data, while a pre-processing service may pre-process the time series data to obtain pre-processed time series data. A decomposition service may decompose the pre-processed time series data into a plurality of pieces of time series data of the particular time length at different levels, and a detection service may determine or detect whether a piece of time series data at a particular level in a frequency domain includes a periodic component candidate. In implementations, a validation service may whether the periodic component candidate in the piece of time series data at the particular level is a true periodic component of the input time series data in a time domain.

Moreover, although in the examples described herein, the periodicity detection system may be implemented as a combination of software and hardware installed in a single device, in other examples, the periodicity detection system may be implemented and distributed in multiple devices or as services provided in one or more computing devices over a network and/or in a cloud computing architecture.

The application describes multiple and varied embodiments and implementations. The following section describes an example framework that is suitable for practicing various implementations. Next, the application describes example systems, devices, and processes for implementing a periodicity detection system.

Example Environment

FIG. 1 illustrates an example environment 100 usable to implement a periodicity detection system. The environment 100 may include a periodicity detection system 102. In this example, the periodicity detection system 102 is described to exist as an individual entity or device. In some instances, the periodicity detection system 102 may be included in a computing device, such as a client device 104. In other instances, the periodicity detection system 102 may be included in one or more servers, such as one or more servers 106 in a cloud. For example, some or all of the functions of the periodicity detection system 102 may be included in or provided by the client device 104, and/or the one or more servers 106, which are connected and communicated via a network 108.

In implementations, the client device 104 may be implemented as any of a variety of computing devices including, but not limited to, a desktop computer, a notebook or portable computer, a handheld device, a netbook, an Internet appliance, a tablet or slate computer, a mobile device (e.g., a mobile phone, a personal digital assistant, a smart phone, etc.), a server computer, etc., or a combination thereof.

The network 108 may be a wireless or a wired network, or a combination thereof. The network 108 may be a collection of individual networks interconnected with each other and functioning as a single large network (e.g., the Internet or an intranet). Examples of such individual networks include, but are not limited to, telephone networks, cable networks, Local Area Networks (LANs), Wide Area Networks (WANs), and Metropolitan Area Networks (MANs). Further, the individual networks may be wireless or wired networks, or a combination thereof. Wired networks may include an electrical carrier connection (such a communication cable, etc.) and/or an optical carrier or connection (such as an optical fiber connection, etc.). Wireless networks may include, for example, a WiFi network, other radio frequency networks (e.g., Bluetooth®, Zigbee, etc.), etc.

In implementations, the periodicity detection system 102 may receive a request for determining or estimating the number of periodicities in input time series data and respective time periods. Upon receiving the request, the periodicity detection system 102 may process the input time series data, and determine the number of periodicities in input time series data and the respective time periods using a periodicity detection method proposed in this disclosure.

Example Periodicity Detection System

Figure 2:
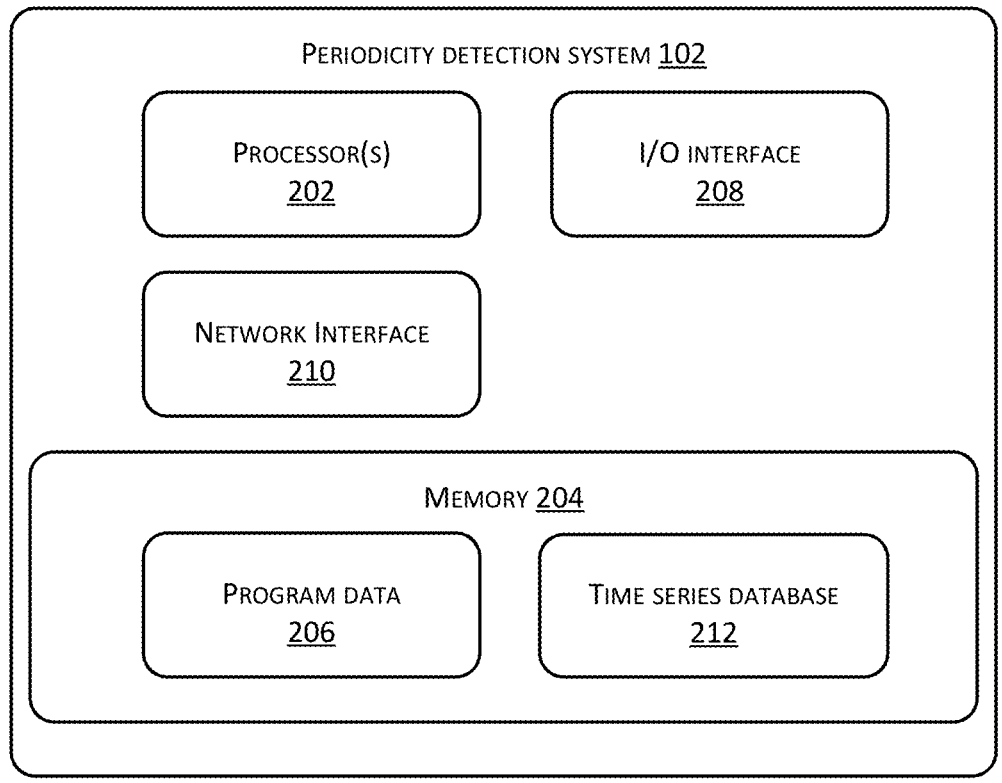
FIG. 2 illustrates the example periodicity detection system in more detail.

FIG. 2 illustrates the periodicity detection system 102 in more detail. In implementations, the periodicity detection system 102 may include, but is not limited to, one or more processors 202, a memory 204, and program data 206. In implementations, the periodicity detection system 102 may further include an input/output (I/O) interface 208, and/or a network interface 210. In implementations, some of the functions of the periodicity detection system 102 may be implemented using hardware, for example, an ASIC (i.e., Application-Specific Integrated Circuit), a FPGA (i.e., Field-Programmable Gate Array), and/or other hardware.

In implementations, the processors 202 may be configured to execute instructions that are stored in the memory 204, and/or received from the input/output interface 208, and/or the network interface 210. In implementations, the processors 202 may be implemented as one or more hardware processors including, for example, a microprocessor, an application-specific instruction-set processor, a physics processing unit (PPU), a central processing unit (CPU), a graphics processing unit, a digital signal processor, a tensor processing unit, etc. Additionally or alternatively, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc.

The memory 204 may include computer readable media in a form of volatile memory, such as Random Access Memory (RAM) and/or non-volatile memory, such as read only memory (ROM) or flash RAM. The memory 204 is an example of computer readable media.

The computer readable media may include a volatile or non-volatile type, a removable or non-removable media, which may achieve storage of information using any method or technology. The information may include a computer readable instruction, a data structure, a program module or other data. Examples of computer readable media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include any transitory media, such as modulated data signals and carrier waves.

Although in this example, only hardware components are described in the periodicity detection system 102, in other instances, the periodicity detection system 102 may further include other hardware components and/or other software components such as program units to execute instructions stored in the memory 204 for performing various operations. For example, the periodicity detection system 102 may further include a time series database 212 storing time series data.

Example Methods

Figure 3:
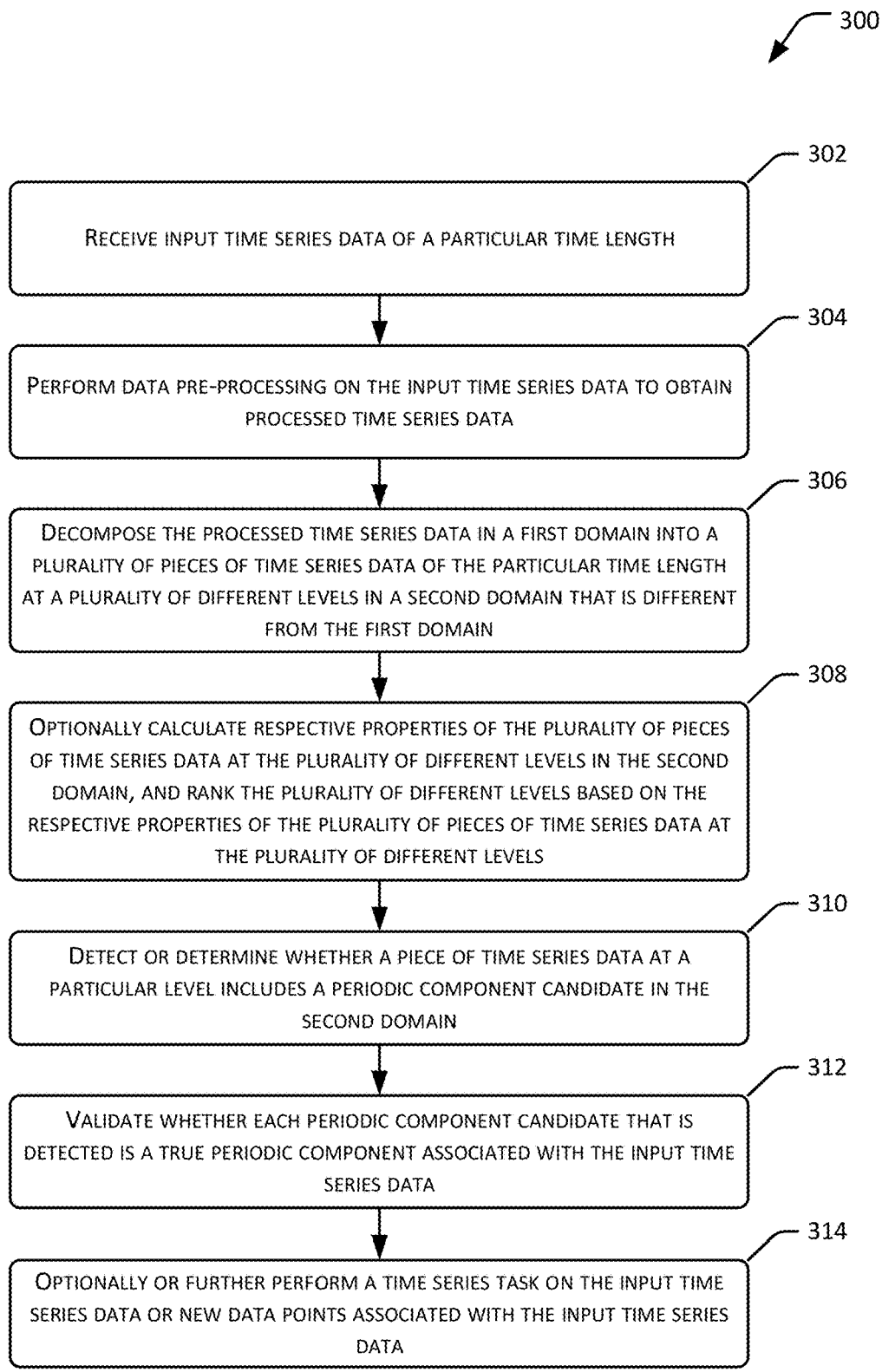
FIG. 3 illustrates an example method of periodicity detection.

FIG. 3 shows a schematic diagram depicting an example method of periodicity detection. The method of FIG. 3 may, but need not, be implemented in the environment of FIG. 1 and using the system of FIG. 2. For ease of explanation, a method 300 is described with reference to FIGS. 1 and 2. However, the method 300 may alternatively be implemented in other environments and/or using other systems.

The method 300 is described in the general context of computer-executable instructions. Generally, computer-executable instructions can include routines, programs, objects, components, data structures, procedures, modules, functions, and the like that perform particular functions or implement particular abstract data types. Furthermore, each of the example methods are illustrated as a collection of blocks in a logical flow graph representing a sequence of operations that can be implemented in hardware, software, firmware, or a combination thereof. The order in which the method is described is not intended to be construed as a limitation, and any number of the described method blocks can be combined in any order to implement the method, or alternate methods. Additionally, individual blocks may be omitted from the method without departing from the spirit and scope of the subject matter described herein. In the context of software, the blocks represent computer instructions that, when executed by one or more processors, perform the recited operations. In the context of hardware, some or all of the blocks may represent application specific integrated circuits (ASICs) or other physical components that perform the recited operations.

Referring back to FIG. 3, at block 302, the periodicity detection system 102 may receive input time series data of a particular time length.

In implementations, the periodicity detection system 102 may receive input time series data (i.e., data associated with an input time series).

The input time series data may include or correspond to observation data obtained or collected for a particular application. Examples of the input time series data may include, but are not limited to, hourly or daily numbers of users accessing a certain website, percentages or amounts of computing resources consumed in every second, every ten seconds or every minute, etc.

In implementations, the input time series data that may include a plurality of different components. By way of example and not limitation, the input time series data may include, but is not limited to, one or more seasonal/periodic components (which are called periodic components hereinafter), a trend component, a noise component, and an outlier component. For example, the input time series data may be modeled as follows:

$$y_t = \tau_t + \Sigma_{i=1}^{m} s_{i,t} + r_t, t=0,1,\ldots,N-1 \quad (1)$$

where $y_t$ represents an observed data point of the input time series at time t, $\tau_t$ represents a trend component, $s_t = \Sigma_{i=1}^{m} s_{i,t}$ is a summation of one or more seasonal/periodic components with periods as $T_i$, $i=1,\ldots,m$, and $r_t = a_t + n_t$ represents a remaining component which may include a noise component $n_t$ and a possible outlier component $a_t$.

At block 304, the periodicity detection system 102 may perform data pre-processing on the input time series data to obtain processed time series data.

In implementations, the periodicity detection system 102 may pre-process the input time series data prior to determining or estimating the number of periodic components and respective period lengths in the input time series. In implementations, the periodicity detection system 102 may perform data processing (which may include, but is not limited to, data normalization, de-trending, outlier removal, etc.) on the input time series data to produce processed time series data. In implementations, the periodicity detection system 102 may apply a noise/outlier removal filter to remove noises and outliers from the input time series data.

Examples of the noise/outlier filter may include, but are not limited to, a bilateral filter, a Kalman filter, a Gaussian filter, etc. Furthermore, after the trend component, the noise component and the outlier component are removed from the input time series data, the periodicity detection system 102 may then normalize the input time series data.

In implementations, the periodicity detection system 102 may further estimate the trend component in the input time series data, and then perform de-trending on the input time series data. By way of example and not limitation, the periodicity detection system 102 may select and apply an H-P (Hodrick-Prescott) trend filter on the input time series data to obtain an estimated trend component $f_t$, which is given as follows:

$$\hat{\tau}_t = \underset{\tau_t}{\operatorname{argmin}} \frac{1}{2} \sum_{t=0}^{N-1} (y_t - \tau_t)^2 + \lambda \sum_{t=1}^{N-2} (\tau_{t-1} - 2\tau_t + \tau_{t+1})^2 \quad (2)$$

After obtaining the estimated trend component $f_t$, the periodicity detection system 102 may de-trend the input time series data by removing the estimated trend component from the input time series data, i.e., $y'_t = y_t - \hat{\tau}_t$.

Although in this example an H-P (Hodrick-Prescott) trend filter is said to be used as a de-trending filter and applied on the input time series data, in other instances, other de-trending filters may be used to estimate and remove the trend component from the input time series data. For example, the periodicity detection system 102 may apply a linear regression filter (or linear regression) on the input time series data to estimate the trending component, and remove the trending component from the input time series data.

At block 306, the periodicity detection system 102 may decompose the processed time series data in a first domain into a plurality of pieces of time series data of the particular time length at a plurality of different levels in a second domain that is different from the first domain.

In implementations, after pre-processing the input time series data to obtain the processed time series data, the periodicity detection system 102 may decompose the processed time series data into a plurality of pieces of time series data of the particular time length at different levels according to a particular decomposition method. In implementations, the particular decomposition method may include a transformation method that transforms the processed time series data from a time domain (i.e., the first domain) into a time-frequency domain (i.e., the second domain), and decomposes the processed time series data into a plurality of pieces of time series data (or called a plurality of time series components) in the time-frequency domain. By way of example and not limitation, the particular decomposition method may include, but is not limited to, a maximal overlap discrete wavelet transform (MODWT), a wavelet transform, a Gabor transform, a Fourier transform, etc.

By way of example and not limitation, a maximal overlap discrete wavelet transform is used herein as an example to illustrate how the periodicity detection system 102 decomposes the processed time series data into a plurality of pieces of time series data of the particular time length at different levels to facilitate periodicity detection. In implementations, the maximal overlap discrete wavelet transform may isolate multiple periodic components that are interlaced with each other. In implementation, the maximal overlap discrete wavelet transform described herein has the advantages of capability of handling any sample size (i.e., the size or time length of the input time series data), having increased resolutions at coarse scales, and having a more asymptotically efficient wavelet variance estimator than other transforms such as a discrete wavelet transform.

In this example, Daubeuchies wavelets based on MODWT is employed. In implementations, when the MODWT is applied on the processed time series data $y'_t$, wavelet and scaling coefficients with $w_{j,t}$ and $v_{j,t}$ that are obtained are given by:

$$w_{j,t} = \sum_{l=0}^{L_j-1} h_{j,l} y'_{t-l \bmod N} \quad v_{j,t} = \sum_{l=0}^{L_j-1} g_{j,l} y'_{t-l \bmod N} \quad (3)$$

where $\{h_{j,l}\}_{l=0}^{L_j-1}$ and $\{g_{j,l}\}_{l=0}^{L_j-1}$ are jth level wavelet filter and scaling filter respectively. A filter width thereof is $L_j = (2^j-1)(L_1-1)$, where $L_1$ is the width of unit-level Daubechies wavelet coefficients.

In real-world scenarios, time series (e.g., the input time series) are usually non-stationary and noises therein are normally not Gaussian. The decomposition method used by the periodicity detection system 102 therefore needs to overcome these shortcomings or at least overcome these shortcomings to some extent. In this example of using MODWT, if $y'_t$ is dth order stationary time series, this means that $y'_t$ is non-stationary and its dth order backward difference $$y'^{(d)}_t = \sum_{k=0}^{d} \frac{(-1)^k d!}{k!(d-k)!} y'_{t-k}$$

is stationary. Given a definition of a particular wavelet coefficient process $\overline{w}_{j,t} = \sum_{l=0}^{L_j-1} h_{j,l} y'$, $w_{j,t}$ is equal to the wavelet coefficient $\overline{w}_{j,t}$ in Equation (3) for $t \geq L_j-1$ (i.e., non-boundary coefficients). In this case, the following property exists for Daubechies MODWT:

In implementations, if the wavelet filter length $L_j \geq 2d$, then $\overline{w}_{j,t}$ is a stationary process and only have short-term dependence with power spectral density (PSD) given by:

$$S_j(f) = \frac{|\sum_{l=0}^{L_j-1} h_{j,l} e^{-j2\pi fl}|^2 S_{y'^{(d)}_t}(f)}{(4\sin^2(\pi f))^d} \quad (4)$$

where $S_{y'^{(d)}_t}(f)$ is PSD of $y'^{(d)}_t$.

Furthermore, if $y'_t$ is a non-Gaussian process, the wavelet coefficients of Daubechies MODWT can also be near Gaussian due to the following property:

In implementations, for certain non-Gaussian processes, $w_{j,t}$ is approximate Gaussian (particularly for large level j) because linear filtering tends to induce Gaussianity.

Accordingly, even if the input time series is a non-Gaussian process with long memory and high degree of correlation, transformation coefficients of the decomposition method (in this case, the wavelet coefficients from MODWT) can be made to be approximately Gaussian, uncorrelated and stationary, thus improving the performance of periodicity detection for the input time series.

At block 308, the periodicity detection system 102 may optionally calculate respective properties of the plurality of pieces of time series data at the plurality of different levels in the second domain, and rank the plurality of different levels based on the respective properties of the plurality of pieces of time series data at the plurality of different levels.

In implementations, the periodicity detection system 102 may calculate or estimate one or more properties associated with a piece of time series data at each level in the second domain (e.g., the time-frequency domain). In implementations, one or more properties associated with a piece of time series at a certain level may include information that helps in evaluating or estimating the probability or likelihood of having a periodic pattern (or a periodic component) in that level. In implementations, one or more properties associated with a piece of time series data at a certain level in the second domain may include, but are not limited to, a wavelet variance of that level. In implementations, the periodicity detection system 102 may rank the plurality of pieces of time series data of the particular time length at the plurality of different levels according to an order of respective wavelet variances of the plurality of pieces of time series data at the plurality of different levels.

By way of example and not limitation, the above example of MODWT is used herein for illustration. After decomposing the processed time series data into the plurality of pieces of time series data at the plurality of different levels, $\|y'\|^2 = \sum_{j=1}^{J_0} \|w_j\|^2 + \|v_{J_0}\|^2$, for $J_0$ levels, based on energy preserving of MODWT. This may lead to a wavelet variance decomposition as $$\hat{\sigma}_{y'}^2 = \sum_{j=1}^{J_0} \hat{\sigma}_{w_j}^2 + \hat{\sigma}_{v_{J_0}}^2,$$

where $\hat{\sigma}_{w_j}^2$ and $$\hat{\sigma}_{v_{J_0}}^2$$

are the jth level empirical wavelet variance and level $J_0$ empirical scaling variance respectively. If y' is stationary, $\hat{\sigma}_{y'}^2 = \sum_{j=1}^{\infty} \hat{\sigma}_{w_j}^2$. In this way, the wavelet variance may provide a scale-based analysis of variance (ANOVA) for a time series, and offer an intuitive explanation of how the time series is structured.

In implementations, a biweight midvariance may be used as a robust estimation of the wavelet variance in this example due to its resistant and efficient nature. Furthermore, the first $L_j-1$ wavelet coefficients may be excluded or ignored for the purpose of unbiased variance estimation, because the wavelet transform introduces periodic extension as defined in Equation (3). In implementations, the following formulation for robust unbiased estimation of wavelet variance may be adopted:

$$\hat{v}_{w_j}^2 = \frac{M_j \sum_{t=L_j-1}^{N-1} (w_{j,t} - Med(w_{j,t}))^2 (1-u_t^2)^4 I(|u_t|<1)}{\left(\sum_{t=L_j-1}^{N-1} (1-u_t^2)(1-5u_t^2) I(|u_t|<1)\right)^2} \quad (5)$$

where $I(x)$ is an indicator function, $u_t$ is calculated or defined as $u_t = (w_{j,t} - Med(w_j,t))/(9 \cdot MAD(w_{j,t}))$, and $M_j = N - L_j + 1$ is the number of non-boundary coefficients at the jth level. $Med(x)$ and $MAD(x)$ are median and mean absolute deviation values, respectively.

In implementations, the wavelet variance estimation helps to locate a periodic component of a time series in a frequency domain because the wavelet variance estimation may be considered as a rough estimate of the PSD. In implementations, the jth level wavelet variance estimation is approximately equal to the integral of the PSD at the nominal octave passband as $\frac{1}{2}^{j+1} \leq |f| \leq \frac{1}{2}^j$, that is, $$\hat{v}_{w_j}^2 \approx \int_{1/2^{j+1} \leq |f| \leq 1/2^j} S_{y'}(f) df.$$

Furthermore, the wavelet filter $h_{j,l}$ in Equation (3) in this example may perform bandpass filter with nominal passband as $\frac{1}{2}^{j+1} \leq |f| \leq \frac{1}{2}^j$. Therefore, if a periodic component of the processed time series $y'_t$ is located in the nominal passband of $\frac{1}{2}^{j+1} \leq |f| \leq \frac{1}{2}^j$, this periodic component can be filtered into the jth level wavelet coefficient and a large value of $\hat{\sigma}_{w_j}^2$ may be resulted or expected. Table 1 below shows a relationship between possible period lengths and wavelet levels.

TABLE 1

Possible period lengths of periodic components at different MODWT levels

| Level | 1 | 2 | ... | n | ... | $\log_2 N$ |
|---|---|---|---|---|---|---|
| T | 2~4 | 4~8 | ... | $2^n \sim 2^{n+1}$ | | N~∞ |

In implementations, after obtaining respective wavelet variances (or biweight midvariances) of the plurality of different levels, the periodicity detection system 102 may rank or order the plurality of different levels according to a descending order of sizes of the respective wavelet variances (or biweight midvariances). In implementations, the periodicity detection system 102 may select a predetermined number of different levels from among the plurality of different levels based on rankings of corresponding wavelet variances (or biweight midvariances) that are estimated.

By way of example and not limitation, the periodicity detection system 102 may select a predetermined number (e.g., two, five, ten, twenty, etc.) of different levels with corresponding wavelet variances (or biweight midvariances) being ranked in the first few (e.g., two, five, ten, twenty, etc.) ranking positions (i.e., corresponding first two positions, corresponding first five positions, corresponding first ten positions, corresponding first twenty positions, etc.) in the descending order of values of the respective wavelet variances (or biweight midvariances).

Alternatively, the periodicity detection system 102 may not perform selection, and may allow the plurality of pieces of time series data at all of the plurality of different levels to be examined for periodic component candidates as described in the next block.

At block 310, the periodicity detection system 102 may detect or determine whether a piece of time series data at a particular level includes a periodic component candidate in the second domain.

In implementations, the periodicity detection system 102 may examine a respective piece of time series data at each level of the plurality of different levels (or the predetermined number of levels if ranking and selection are performed at block 308) in the second domain, and determine whether the respective piece of time series data includes a periodic component candidate. In implementations, the periodicity detection system 102 may perform a statistical test on a parameter associated with the respective piece of time series data to determine whether the respective piece of time series data includes a periodic component candidate. In implementations, the statistical test may include, for example, a Fisher's test, and the parameter may include, but is not limited to, a periodogram, a Huber-periodogram, etc.

For the sake of illustration and not limitation, an example in which the periodicity detection system 102 performs a Fisher's test on a Huber-periodogram associated with a piece of time series data at a particular level to determine whether the piece of time series data or the particular level includes a periodic component candidate is described as follows.

In implementations, the length of the wavelet coefficient $w_1$ of each level may be doubled by padding N zeros to form $x_j = [w_j^T, 0, \ldots, 0]^T$, where the length of $x_j$ is N'=2N. In implementations, such padding operation is performed for the purpose of subsequent validation of detected periodicity or periodic component candidate (e.g., obtaining a robust indicator such as an ACF (auto-correlation) through a Huber-periodogram). For the sake of simplicity and clarity, level index j is dropped in the following description.

In implementations, to detect a hidden periodic component (or periodicity), a Fisher's test may be used and define a g-statistic as follows:

$$g = \frac{\max_k P_k}{\sum_{l=1}^{N} P_l} l = 1, 2, \ldots, N \tag{6}$$

where $P_k$ is a periodogram based on discrete Fourier transform (DFT), and is defined as:

$$P_k = \|DFT\{x_t\}\|^2 = \frac{1}{N'} \sum_{t=0}^{N'} \|x_t e^{-i2\pi kt/N'}\|^2 \tag{7}$$

where $i=\sqrt{-1}$.

In implementations, the Fisher's test in Equation (6) sets a null hypothesis $H_0$ that a corresponding time series (i.e., a piece of input time series data) is generated by a Gaussian white noise sequence, against an alternative hypothesis $H_1$ that the data is generated by a Gaussian white noise sequence with a superimposed deterministic periodic component. Under the hypothesis $H_0$ of Gaussian white noise with a variance $\sigma^2$, a distribution of periodogram may be obtained as a chi-square distribution with two degrees of freedom, i.e., $P_k \sim (\frac{1}{2})\sigma^2 \chi^2(2)$. In this way, a distribution of g-statistic under the null hypothesis $H_0$ may be expressed as:

$$P(g \geq g_0) = 1 - \sum_{k=1}^{\lfloor 1/g_0 \rfloor} \frac{(-1)^{k-1} N!}{k!(N-k)!} (1 - kg_0)^{N-1},$$

which gives a p-value to determine whether a time series is periodic (or a piece of time series data at a particular level includes a periodic component). In implementations, if the p-value is less than a predefined threshold α, the null hypothesis $H_0$ is rejected, and the time series (or the piece of time series data at the particular level) includes a periodic component. In this case, the period length of the periodic component may be calculated as N/k, where $$k = \operatorname*{argmax}_k P_k.$$

Since noises being Gaussian may not be true in real-world time series data, in implementations, the Huber-periodogram is introduced herein to make the periodogram more robust. In implementations, a periodogram may be formulated as solving a least square problem equivalently, and a more robust Huber loss may be used as a loss function for solving the least square problem. In implementations, the Huber loss is a combination of a sum-of-squares loss and a least absolute deviation (LAD) loss, which is quadratic on small values of errors and grows linearly for large values of errors. Therefore, the Huber loss is robust and adaptive to different types of data. Specifically, the periodogram of Equation (7) may be equivalently computed by solving the following problem:

$$P_k = \frac{N'}{4} |\hat{\beta}_{LS}(k)|^2 = \frac{N'}{4} \left| \operatorname*{argmin}_{\beta \in R^2} \|\phi\beta - x\|^2 \right|^2 \tag{8}$$

where $\hat{\beta}_{LS}(k)$ is a least square (LS) estimation of a harmonic regressor $\phi_t = [\cos(2\pi kt/N'), \sin(2\pi kt/N')]$, $\phi = [\phi_0, \phi_1, \ldots, \phi_{N'-1}]^T$, and $x = [x_0, x, \ldots, x_{N'-1}]^T$.

In implementations, based on Equation (8), a sum-of-squares loss function may be replaced by a family of functions used in an M-estimator, leading to a robust M-periodogram, namely:

$$P_k^M = \frac{N'}{4} |\hat{\beta}_{LS}(k)|^2 = \frac{N'}{4} \left| \operatorname*{argmin}_{\beta \in R^2} \gamma(\phi\beta - x) \right|^2 \tag{9}$$

where $\gamma(x)$ is a robustifying objective function and is defined as $\gamma(x) = \Sigma_{t=0}^{N'-1} \gamma(x_t)$.

Due to the robust and adaptive nature of the Huber loss on different types of data, the Huber-periodogram so developed can lead to a robust indicator for subsequent validation of detected periodicity (or periodic component candidate), which is very helpful in validating any periodic component candidate that is found. In implementations, $\gamma(x)$ for Huber-periodogram may be defined as follows:

$$\gamma(x) = \gamma_\varsigma^{hub}(x) = \begin{cases} \frac{1}{2} x^2 & |x| \leq \varsigma \\ \varsigma|x| - \frac{1}{2}\varsigma^2 & |x| > \varsigma \end{cases} \tag{10}$$

The Huber-periodogram in Equations (9) and (10) may be efficiently solved by ADMM (Alternating Direction Method of Multipliers) with $\mathcal{O}(N/\epsilon)$ number of iterations and $\mathcal{O}(N)$ complexity for each iteration. Firstly, an optimization problem in Huber-periodogram may be reformulated as follows:

$$\min \gamma_\varsigma^{hub}(z) \tag{11}$$

$$\text{s.t. } \phi\beta - x = z \tag{12}$$

In implementations, an augmented Lagrangian can be obtained as $$L_\rho(\beta, z, v) = \gamma_\varsigma^{hub}(z) + v^T(\phi\beta - x - z) + \frac{\rho}{2}\|\phi\beta - x - z\|_2^2,$$

where v is a dual variable, and ρ is a penalty parameter. By following an ADMM procedure and taking a proximal operator the Huber function $\gamma_\zeta^{hub}(z)$, updating steps can be obtained as follows:

$$\beta^{k+1} = (\phi^T\phi)^{-1}\phi^T(z^k + x - u^k) \quad (13)$$

$$z^{k+1} = \frac{\rho}{1+\rho}(\phi\beta^{k+1} + u^k - x) + \frac{\rho}{1+\rho}S_{\frac{\zeta(1+\rho)}{\rho}}(\phi\beta^{k+1} + u^k - x) \quad (14)$$

$$u^{k+1} = u^k + \phi\beta^{k+1} - z^{k+1} - x \quad (15)$$

where u=(1/ρ)v is a scaled dual variable to make the formulation more convenient. The soft thresholding operation $S_\rho(x)$ n z-minimization step can be efficiently calculated by:

$$s_\rho(x) = \begin{cases} 0, & |x| \leq \rho \\ x - \rho\text{sgn}(x) & |x| > \rho \end{cases} \quad (16)$$

For the complexity of the ADMM in the Huber-periodogram, $\mathcal{O}(N)$ computational complexity for each iteration can be obtained based on Equations (13)-(15) (with φ being an N×2 matrix). Furthermore, the value of $(\phi^T\phi)^{-1}\phi^T$ in Equation (13) can be stored to save time because this value is unchanged in each iteration. Given a required or predetermined number of iterations, E-optimal solution within $\mathcal{O}(N/E)$ iterations can be obtained. For example, in this example for the Huber-periodogram, the ADMM may converge within a few tens of iterations.

In implementations, the distribution of $P_k^M$ from Huber-periodogram behaves similarly to a vanilla periodogram as n→∞. Therefore, a statistical test (such as a Fisher's test) based on the Huber-periodogram can be used for detecting a periodic component in a piece of time series data at a particular level decomposed from the processed time series data.

At block 312, the periodicity detection system 102 may validate whether each periodic component candidate that is detected is a true periodic component associated with the input time series data.

In implementations, after obtaining or detecting one or more periodic component candidates at one or more levels of the plurality of different levels (or the predetermined number of levels if ranking and selection are performed at block 308) using the statistical test (e.g., the Fisher's test) for each level (or wavelet coefficient of each level), the periodicity detection system 102 may validate whether each periodic component candidate of the one or more periodic component candidates detected at one or more levels to improve an accuracy of periodicity detection and to avoid or reduce false positives of periodicity detection.

In implementations, the periodicity detection system 102 may validate whether a periodic component candidate included in a piece of time series data at a particular level in the second domain (e.g., the time-frequency domain) is a true periodic component of the input time series based on a predetermined indicator associated with the piece of time series data at the particular level. In implementations, the predetermined indicator associated with the piece of time series data at the particular level may include, but is not limited to, an ACF (autocorrelation function) of the piece of time series of that particular level calculated in the first domain (e.g., the time domain), etc.

In implementations, the periodicity detection system 102 may obtain an indicator (e.g., an autocorrelation) of the piece of time series data at the particular level in the time domain. The periodicity detection system 102 may then calculate a median distance of a plurality of peaks having respective heights greater than a predetermined threshold in the indicator (i.e., the autocorrelation), and validate that the periodic component is the true periodic component with a period length as the median distance of the plurality of peaks in the response to determining that the median distance is located within a predetermined range associated with the particular level of the piece of time series data. Alternatively, if the median distance is located outside the predetermined range associated with the particular level of the piece of time series data, the periodicity detection system 102 may determine that the periodic component is not a true periodic component of the input time series data.

By way of example and not limitation, an ACF is used as an example of the predetermined indicator herein to illustrate a process of validating a periodic component candidate that is detected at block 310 in the first domain (e.g., the time domain). In implementations, for an ACF of a piece of time series data from wavelet coefficient $w_{j,t}$ at the jth level (which is denoted as $w_t$ for the sake of simplicity and without loss of generality), a normalized estimation may be calculated as:

$$ACF(t) = \frac{1}{(N-t)\delta_w^2}\sum_{n=0}^{N-t-1} w_n w_{n+1}, t = 0, 1, \ldots, N-1 \quad (17)$$

where $\delta_w^2$ is a sample variance of $w_t$.

In implementations, upon calculating an ACF of a piece of time series data at a particular level, the periodicity detection system 102 may compare the ACF with a predetermined threshold, and validate whether a periodic component candidate included in the piece of time series data or the particular level is a true periodic component of the input time series data. For example, if the ACF is greater than or equal to the predetermined threshold, the periodicity detection system 102 may validate or confirm that the periodic component candidate included in the piece of time series data or the particular level is a true periodic component of the input time series data.

In implementations, since the ACF described above is not robust to outliers and has $\mathcal{O}(N^2)$ complexity, in some instances, the periodicity detection system 102 may calculate a new type of ACF that is robust and has $\mathcal{O}(N \log N)$ complexity using the Huber-periodogram. In implementations, given that the input time series data is real-valued data, a full-range periodogram may be described as follows:

$$\overline{P}_k = \begin{cases} P_k^M & k = 0, 1, \ldots, N-1 \\ \frac{(\sum_{k=0}^{N-1} x_{2k} - x_{2k+1})^2}{N'} & k = N \\ P_{N'-k}^M & k = N+1, \ldots, N'-1 \end{cases} \quad (18)$$

In implementations, a new type of ACF (or called a robust ACF) based on the periodogram may be obtained according to a Wiener-Khinchin theorem, and may be defined as:

$$robustACF(t) = \frac{p_t}{(N-t)p_0}, t = 0, 1, \ldots, N-1 \quad (19)$$

where $p_t$ is an inverse discrete Fourier transform (IDFT) of $\overline{P}_k$, and is defined as:

$$p_t = IDFT\{\overline{P}_k\} = \frac{1}{\sqrt{N'}} \sum_{k=0}^{N'-1} \overline{P}_k e^{i\pi 2kt/N'} \quad (20)$$

In implementations, in order to detect a periodic component in each level of the plurality of different levels (or the predetermined number of levels if ranking and selection are performed at block 308), the periodicity detection system 102 may summarize or locate peaks of the robust ACF through a peak detection method. Examples of the peak detection method may include, but are not limited to, multiscale-based peak detection (AMPD) based on calculation and analysis of a local maxima scalogram of the robust ACF, using smoothing and then fitting a known function (e.g., a polynomial) to the robust ACF, or matching a known peak shape to the robust ACF, etc.

In implementations, after locating the peaks of the robust ACF, periodicity detection system 102 may then calculate a median distance between every two of the located peaks whose heights are greater than or equal to a predefined height threshold. In implementations, based on the resolution of periodogram (of each level), a peak value of periodogram $P_k^M$ at an index k corresponds to a period length in a range of $$\left[\frac{N}{k}, \frac{N}{k-1}\right).$$

In implementations, the periodicity detection system 102 may validate that the periodic component candidate detected in the piece of time series data at the particular level is a true period component of the input time series data if the median distance between every two of the located peaks whose heights are greater than or equal to the predefined height threshold is located in a predetermined range, namely, $$R_k = \left[\frac{1}{2}\left(\frac{N}{k+1} + \frac{N}{k}\right) - 1, \ldots, \frac{1}{2}\left(\frac{N}{k} + \frac{N}{k-1}\right) + 1\right].$$

Furthermore, a period length of such periodic component candidate (or true period component) is the median distance between every two of the located peaks whose heights are greater than or equal to the predefined height threshold.

In implementations, the periodicity detection system 102 may calculate a robust ACF for each level of the plurality of different levels (or the predetermined number of levels if ranking and selection are performed at block 308), and determine and validate whether a respective periodic component candidate detected at each level is a true periodic component using the aforementioned validation for periodicity detection. Accordingly, the periodicity detection system 102 may detect or estimate one or more periodic components from the input time series data.

At block 314, the periodicity detection system may optionally or further perform a time series task on the input time series data or new data points associated with the input time series data.

In implementations, after detecting or estimating the one or more periodic components in the input time series data, the periodicity detection system 102 may perform a time series task, such as classification, forecasting, anomaly detection, clustering, and compression, etc.

By way of example and not limitation, the periodicity detection system 102 may re-estimate the trend component and/or the remaining component (which includes the noise component and the outlier component) based on the one or more detected periodic components. For example, the periodicity detection system 102 may subtract the one or more detected periodic components from the input time series data, and re-run the trend extraction as described in the foregoing description to obtain a new or better estimate of the trend component. The periodicity detection system 102 may obtain the remaining component by subtracting the one or more periodic components and the trend component from the input time series data.

In implementations, the periodicity detection system 102 may iteratively perform this process of determining the trend component, the one or more periodic components and the remaining component until a predetermined number of iterations are reached or until a degree of convergence falls within a predetermined threshold or percentage, etc.

In implementations, the periodicity detection system 102 may perform an anomaly detection on the input time series data or new data points for the input time series data. Depending on which type of anomaly is to be determined, the periodicity detection system 102 may perform one or more statistical tests on the trend component, the one or more periodic components, and/or the remaining component.

Although the above method blocks are described to be executed in a particular order, in some implementations, some or all of the method blocks can be executed in other orders, or in parallel.

Other Periodicity Detection Methods

For the sake of further illustrating the improvements of the periodicity detection method proposed in this disclosure, comparisons with different periodicity detection methods are described below. Table 2 below shows five different periodicity detection methods that are used for comparisons.

TABLE 2

Periodicity detection methods used in comparisons

| Algorithm | Description |
|---|---|
| ACF-Med | Calculate an vanilla ACF of a time series, and detect peaks of the ACF, with a median value of distances between peaks being treated as a period length of a periodic component of the time series |
| Fisher | Calculate an vanilla periodogram, and perform a Fisher's test on the periodogram, with a period length being N/k if the test is passed, where k is a peak index of the periodogram |
| Siegel | Calculate an vanilla periodogram, detect multiple periods using a Siegel's test, and obtain corresponding multiple periods if the test is passed |
| AUTOPERIOD | Select a list of periodic component candidates based on an vanilla periodogram, and validate the periodic component candidates using an vanilla ACF |
| Wavelet-Fisher | Apply a wavelet transform to decompose a time series into different scales, and apply a Fisher's test to detect a single period at each scale |

To evaluate the performance of different periodicity detection methods, test datasets with complex patterns of length 1024, which includes three periodic components, multiple outliers, a changing trend component, and noises, are generated. Specifically, three sinusoidal waves with an amplitude of one unit and period lengths as 20, 50, and 100 are generated. A triangular signal of an amplitude of ten units and Gaussian noises with different variances ($\sigma_n^2=0.1$ or 2) are further added to the generated sinusoidal waves. Moreover, different number of spikes and dips with an amplitude of five units to represent outliers (an outlier ratio $\eta=1\%$ or 20%) are added to the generated sinusoidal waves. Table 3 below summarizes periodicity detection results from different periodicity detection methods under a mild scenario (with a noise variance $\sigma_n^2=0.1$ and an outlier ratio $\eta=1\%$) and a severe scenario (with a noise variance $\sigma_n^2=2$ and an outlier ratio $\eta=20\%$). As can be seen from Table 3,

TABLE 3

Comparisons between different periodicity detection methods with different degrees of noises and outliers

| Periodicity detection methods | Noise variance $\sigma_n^2$ and outlier ratio $\eta$ | |
|---|---|---|
| | $\sigma_n^2 = 0.1$ and $\eta = 1\%$ | $\sigma_n^2 = 2$ and $\eta = 20\%$ |
| ACF-Med | 19 | 3 |
| Fisher | 50 | 50 |
| Siegel | (20, 102, 51, 512, 93, . . . ) | (20, 49, 102, 51, 1024) |
| AUTOPERIOD | (19, 102) | 20 |
| Wavelet-Fisher | (20, 50, 102, 512) | (20, 50, 98, 205, 5) |
| Proposed method based on Huber-periodogram and robust ACF | (20, 50, 100) | (20, 50, 100) |

As can be seen from the above Table 3, the periodicity detection method proposed in this disclosure accurately detect and estimate the presence of three periodic components and respective period lengths, while other periodicity detection methods either fail to detect a true periodic component or detects a false periodic component (i.e., a false positive). Furthermore, these periodicity detection methods fail to estimate period lengths of the periodic components accurately.

Figure 4:
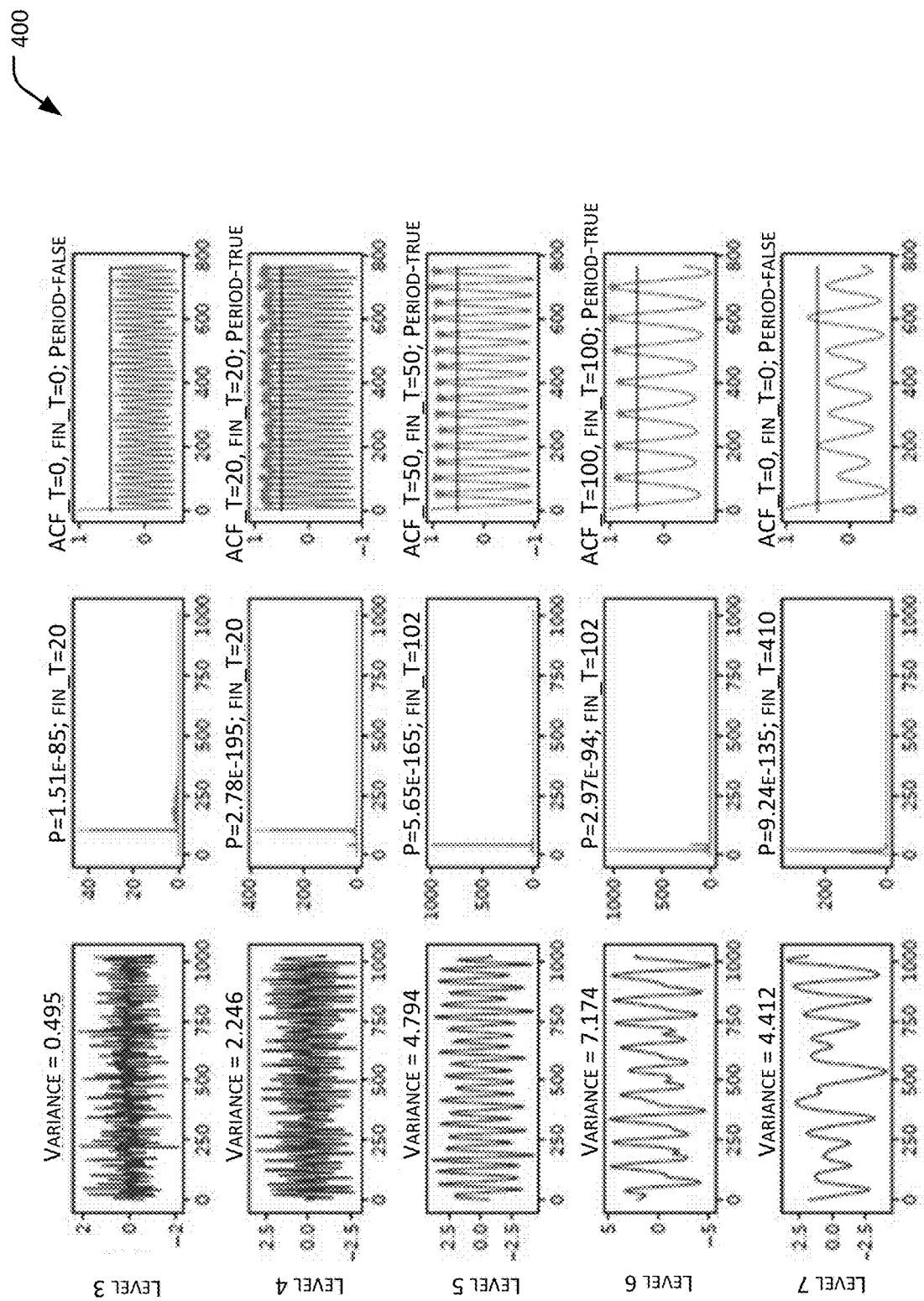
FIG. 4 illustrates intermediate results of the example method of periodicity detection.

To further illustrate how the periodicity detection method proposed in this disclosure accurately detects and estimates periodic components in the test datasets, FIG. 4 shows intermediate results 400 of the proposed periodicity detection method. In FIG. 4, the first column, the second column, and the third column correspond to wavelet coefficients, Huber-periodograms, and robust ACFs obtained for a subset of a plurality of different levels respectively, with each row corresponding to a specific level of the subset. As can be seen from FIG. 4, the decomposition method proposed in this disclosure effectively decouples multiple periodic components that are interlaced with each other, and the Huber-periodograms and the robust ACFs successfully detect and estimate respective period lengths (i.e., 20, 50 and 100 in this example) of the multiple periodic components at corresponding levels (i.e., levels 4, 5 and 6 as shown in FIG. 4).

CONCLUSION

Although implementations have been described in language specific to structural features and/or methodological acts, it is to be understood that the claims are not necessarily limited to the specific features or acts described. Rather, the specific features and acts are disclosed as exemplary forms of implementing the claimed subject matter. Additionally or alternatively, some or all of the operations may be implemented by one or more ASICS, FPGAs, or other hardware.

The present disclosure can be further understood using the following clauses.

Clause 1: A method implemented by one or more computing devices, the method comprising: receiving input time series data of a particular time length; pre-processing the input time series data to obtain processed time series data, the pre-processing comprising at least removing a trend in the input time series data; decomposing the processed time series data into a plurality of pieces of time series data of the particular time length at different levels; detecting whether a piece of time series data at a particular level comprises a periodic component candidate in a frequency domain; and in response to detecting that the piece of time series data at the particular level comprises the periodic component candidate in the frequency domain, validating whether the periodic component candidate in the piece of time series data at the particular level is a true periodic component of the input time series data in a time domain.

Clause 2: The method of Clause 1, wherein pre-processing the time series data comprises applying a Hodrick-Prescott (H-P) filter on the time series data to remove any trend in the time series data.

Clause 3: The method of Clause 1, wherein decomposing the processed time series data comprises decomposing the processed time series data using a maximal overlap discrete wavelet transform.

Clause 4: The method of Clause 1, wherein pre-processing the time series data further comprises: performing normalization on the time series data; and removing outliers from the time series data.

Clause 5: The method of claim 1, wherein detecting whether the piece of time series data at the particular level comprises the periodic component candidate in the frequency domain comprises: obtaining a periodogram or Huber-periodogram for the piece of time series data at the particular level; and determining whether the periodogram or Huber-periodogram satisfies a predetermined hypothesis test.

Clause 6: The method of Clause 1, further comprising ranking the plurality of pieces of time series data of the particular time length at the different levels according to an order of respective variances of the plurality of pieces of time series data.

Clause 7: The method of Clause 1, wherein validating whether the periodic component candidate in the piece of time series data at the particular level is the true periodic component of the input time series data in the time domain comprises: obtaining an ACF (autocorrelation function) or robust ACF of the piece of time series data at the particular level in the time domain; calculating a median distance of a plurality of peaks having respective heights greater than a predetermined threshold in the ACF or robust ACF; and validating that the periodic component is the true periodic component with a period length as the median distance of the plurality of peaks in the response to determining that the median distance is located within a predetermined range associated with the particular level of the piece of time series data.

Clause 8: One or more computer readable media storing executable instructions that, when executed by one or more processors, cause the one or more processors to perform acts comprising: receiving input time series data of a particular time length; pre-processing the input time series data to obtain processed time series data, the pre-processing comprising at least removing a trend in the input time series data; decomposing the processed time series data into a plurality of pieces of time series data of the particular time length at different levels; detecting whether a piece of time series data at a particular level comprises a periodic component candidate in a frequency domain; and in response to detecting that the piece of time series data at the particular level comprises the periodic component candidate in the frequency domain, validating whether the periodic component candidate in the piece of time series data at the particular level is a true periodic component of the input time series data in a time domain.

Clause 9: The one or more computer readable media of claim 8, wherein pre-processing the time series data comprises applying a Hodrick-Prescott (H-P) filter on the time series data to remove any trend in the time series data.

Clause 10: The one or more computer readable media of Clause 8, wherein decomposing the processed time series data comprises decomposing the processed time series data using a maximal overlap discrete wavelet transform.

Clause 11: The one or more computer readable media of Clause 8, wherein pre-processing the time series data further comprises: performing normalization on the time series data; and removing outliers from the time series data.

Clause 12: The one or more computer readable media of Clause 8, wherein detecting whether the piece of time series data at the particular level comprises the periodic component candidate in the frequency domain comprises: obtaining a periodogram or Huber-periodogram for the piece of time series data at the particular level; and determining whether the periodogram or Huber-periodogram satisfies a predetermined hypothesis test.

Clause 13: The one or more computer readable media of Clause 8, the acts further comprising ranking the plurality of pieces of time series data of the particular time length at the different levels according to an order of respective variances of the plurality of pieces of time series data.

Clause 14: The one or more computer readable media of Clause 8, wherein validating whether the periodic component candidate in the piece of time series data at the particular level is the true periodic component of the input time series data in the time domain comprises: obtaining an ACF or robust ACF of the piece of time series data at the particular level in the time domain; calculating a median distance of a plurality of peaks having respective heights greater than a predetermined threshold in the ACF or robust ACF; and validating that the periodic component is the true periodic component with a period length as the median distance of the plurality of peaks in the response to determining that the median distance is located within a predetermined range associated with the particular level of the piece of time series data.

Clause 15: A system comprising: one or more processors; and memory storing executable instructions that, when executed by one or more processors, cause the one or more processors to perform acts comprising: receiving input time series data of a particular time length; pre-processing the input time series data to obtain processed time series data, the pre-processing comprising at least removing a trend in the input time series data; decomposing the processed time series data into a plurality of pieces of time series data of the particular time length at different levels; detecting whether a piece of time series data at a particular level comprises a periodic component candidate in a frequency domain; and in response to detecting that the piece of time series data at the particular level comprises the periodic component candidate in the frequency domain, validating whether the periodic component candidate in the piece of time series data at the particular level is a true periodic component of the input time series data in a time domain.

Clause 16: The system of Clause 15, wherein pre-processing the time series data comprises applying a Hodrick-Prescott (H-P) filter on the time series data to remove any trend in the time series data.

Clause 17: The system of Clause 15, wherein decomposing the processed time series data comprises decomposing the processed time series data using a maximal overlap discrete wavelet transform, and pre-processing the time series data further comprises: performing normalization on the time series data; and removing outliers from the time series data.

Clause 18: The system of Clause 15, wherein detecting whether the piece of time series data at the particular level comprises the periodic component candidate in the frequency domain comprises: obtaining a periodogram or Huber-periodogram for the piece of time series data at the particular level; and determining whether the periodogram or Huber-periodogram satisfies a predetermined hypothesis test.

Clause 19: The system of Clause 15, the acts further comprising ranking the plurality of pieces of time series data of the particular time length at the different levels according to an order of respective variances of the plurality of pieces of time series data.

Clause 20: The system of Clause 15, wherein validating whether the periodic component candidate in the piece of time series data at the particular level is the true periodic component of the input time series data in the time domain comprises: obtaining an ACF or robust ACF of the piece of time series data at the particular level in the time domain; calculating a median distance of a plurality of peaks having respective heights greater than a predetermined threshold in the ACF or robust ACF; and validating that the periodic component is the true periodic component with a period length as the median distance of the plurality of peaks in the response to determining that the median distance is located within a predetermined range associated with the particular level of the piece of time series data.

What is claimed is:

1. A method implemented by one or more computing devices, the method comprising:
    receiving input time series data of a particular time length;
    pre-processing the input time series data to obtain processed time series data, the pre-processing comprising at least removing a trend in the input time series data using a de-trending filter;
    decomposing the processed time series data into a plurality of pieces of time series data of the particular time length at different levels according to a transformation method that transforms the processed time series data from a time domain into a time-frequency domain;
    detecting whether a piece of time series data at a particular level comprises a periodic component candidate in a frequency domain based at least in part on a predetermined hypothesis test; and
    in response to detecting that the piece of time series data at the particular level comprises the periodic component candidate in the frequency domain, validating whether the periodic component candidate in the piece of time series data at the particular level is a true periodic component of the input time series data in the time domain based at least in part on a predetermined indicator associated with the piece of time series data at the particular level in the time domain.

2. The method of claim 1, wherein removing the trend in the input time series data using the de-trending filter comprises applying a Hodrick-Prescott (H-P) filter on the input time series data to remove any trend in the input time series data.

3. The method of claim 1, wherein the transformation method comprises a wavelet transform, a Gabor transform, or a maximal overlap discrete wavelet transform.

4. The method of claim 1, wherein pre-processing the time series data further comprises:
performing normalization on the time series data; and
removing outliers from the time series data.

5. The method of claim 1, wherein detecting whether the piece of time series data at the particular level comprises the periodic component candidate in the frequency domain comprises:
obtaining a periodogram or Huber-periodogram for the piece of time series data at the particular level; and
determining whether the periodogram or Huber-periodogram satisfies the predetermined hypothesis test.

6. The method of claim 1, further comprising ranking the plurality of pieces of time series data of the particular time length at the different levels according to an order of respective variances of the plurality of pieces of time series data.

7. The method of claim 1, wherein the predetermined indicator comprises an autocorrelation function (ACF) or robust ACF of the piece of time series data at the particular level in the time domain, and validating whether the periodic component candidate in the piece of time series data at the particular level is the true periodic component of the input time series data in the time domain comprises:
obtaining the ACF or robust ACF of the piece of time series data at the particular level in the time domain;
calculating a median distance of a plurality of peaks having respective heights greater than a predetermined threshold in the ACF or robust ACF; and
validating that the periodic component is the true periodic component candidate with a period length as the median distance of the plurality of peaks in the response to determining that the median distance is located within a predetermined range associated with the particular level of the piece of time series data.

8. One or more computer readable media storing executable instructions that, when executed by one or more processors, cause the one or more processors to perform acts comprising:
receiving input time series data of a particular time length;
pre-processing the input time series data to obtain processed time series data, the pre-processing comprising at least removing a trend in the input time series data using a de-trending filter;
decomposing the processed time series data into a plurality of pieces of time series data of the particular time length at different levels according to a transformation method that transforms the processed time series data from a time domain into a time-frequency domain;
detecting whether a piece of time series data at a particular level comprises a periodic component candidate in a frequency domain based at least in part on a predetermined hypothesis test; and
in response to detecting that the piece of time series data at the particular level comprises the periodic component candidate in the frequency domain, validating whether the periodic component candidate in the piece of time series data at the particular level is a true periodic component of the input time series data in the time domain based at least in part on a predetermined indicator associated with the piece of time series data at the particular level in the time domain.

9. The one or more computer readable media of claim 8, wherein removing the trend in the input time series data using the de-trending filter comprises applying a Hodrick-Prescott (H-P) filter on the input time series data to remove any trend in the input time series data.

10. The one or more computer readable media of claim 8, wherein the transformation method comprises a wavelet transform, a Gabor transform, or a maximal overlap discrete wavelet transform.

11. The one or more computer readable media of claim 8, wherein pre-processing the time series data further comprises:
performing normalization on the time series data; and
removing outliers from the time series data.

12. The one or more computer readable media of claim 8, wherein detecting whether the piece of time series data at the particular level comprises the periodic component candidate in the frequency domain comprises:
obtaining a periodogram or Huber-periodogram for the piece of time series data at the particular level; and
determining whether the periodogram or Huber-periodogram satisfies the predetermined hypothesis test.

13. The one or more computer readable media of claim 8, the acts further comprising ranking the plurality of pieces of time series data of the particular time length at the different levels according to an order of respective variances of the plurality of pieces of time series data.

14. The one or more computer readable media of claim 8, wherein the predetermined indicator comprises an autocorrelation function (ACF) or robust ACF of the piece of time series data at the particular level in the time domain, and validating whether the periodic component candidate in the piece of time series data at the particular level is the true periodic component of the input time series data in the time domain comprises:
obtaining the ACF or robust ACF of the piece of time series data at the particular level in the time domain;
calculating a median distance of a plurality of peaks having respective heights greater than a predetermined threshold in the ACF or robust ACF;
validating that the periodic component is the true periodic component candidate with a period length as the median distance of the plurality of peaks in the response to determining that the median distance is located within a predetermined range associated with the particular level of the piece of time series data.

15. A system comprising:
one or more processors; and
memory storing executable instructions that, when executed by the one or more processors, cause the one or more processors to perform acts comprising:
receiving input time series data of a particular time length;
pre-processing the input time series data to obtain processed time series data, the pre-processing comprising at least removing a trend in the input time series data using a de-trending filter;
decomposing the processed time series data into a plurality of pieces of time series data of the particular time length at different levels according to a transformation method that transforms the processed time series data from a time domain into a time-frequency domain;
detecting whether a piece of time series data at a particular level comprises a periodic component candidate in a frequency domain based at least in part on a predetermined hypothesis test; and in response to detecting that the piece of time series data at the particular level comprises the periodic component candidate in the frequency domain, validating whether the periodic component candidate in the piece of time series data at the particular level is a true periodic component of the input time series data in the time domain based at least in part on a predetermined indicator associated with the piece of time series data at the particular level in the time domain.

16. The system of claim 15, wherein removing the trend in the input time series data using the de-trending filter comprises applying a Hodrick-Prescott (H-P) filter on the input time series data to remove any trend in the input time series data, and the transformation method comprises a wavelet transform, a Gabor transform, or a maximal overlap discrete wavelet transform.

17. The system of claim 15, wherein pre-processing the time series data further comprises:
performing normalization on the time series data; and
removing outliers from the time series data.

18. The system of claim 15, wherein detecting whether the piece of time series data at the particular level comprises the periodic component candidate in the frequency domain comprises:

obtaining a periodogram or Huber-periodogram for the piece of time series data at the particular level; and
determining whether the periodogram or Huber-periodogram satisfies the predetermined hypothesis test.

19. The system of claim 15, the acts further comprising ranking the plurality of pieces of time series data of the particular time length at the different levels according to an order of respective variances of the plurality of pieces of time series data.

20. The system of claim 15, wherein the predetermined indicator comprises an autocorrelation function (ACF) or robust ACF of the piece of time series data at the particular level in the time domain, and validating whether the periodic component candidate in the piece of time series data at the particular level is the true periodic component of the input time series data in the time domain comprises:

obtaining the ACF or robust ACF of the piece of time series data at the particular level in the time domain;
calculating a median distance of a plurality of peaks having respective heights greater than a predetermined threshold in the ACF or robust ACF;
validating that the periodic component is the true periodic component candidate with a period length as the median distance of the plurality of peaks in the response to determining that the median distance is located within a predetermined range associated with the particular level of the piece of time series data.

* * * * *